United States Patent
Son et al.

(10) Patent No.: US 11,480,819 B2
(45) Date of Patent: Oct. 25, 2022

(54) DISPLAY DEVICE AND METHOD OF MANUFACTURING THE SAME

(71) Applicant: Samsung Display Co., Ltd., Yongin-si (KR)

(72) Inventors: Jin Seok Son, Yongin-si (KR); Min Sung Kim, Yongin-si (KR); Hyun Chul Jin, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 496 days.

(21) Appl. No.: 16/514,936

(22) Filed: Jul. 17, 2019

(65) Prior Publication Data

US 2020/0057323 A1 Feb. 20, 2020

(30) Foreign Application Priority Data

Aug. 20, 2018 (KR) .......................... 10-2018-0096902

(51) Int. Cl.
*G02F 1/1333* (2006.01)
*B23K 26/00* (2014.01)
*G02F 1/1362* (2006.01)
*G02F 1/163* (2006.01)

(52) U.S. Cl.
CPC ............ *G02F 1/1333* (2013.01); *B23K 26/00* (2013.01); *G02F 1/1362* (2013.01); *G02F 1/163* (2013.01); *G02F 1/136222* (2021.01); *G02F 2001/1635* (2013.01); *G02F 2201/121* (2013.01)

(58) Field of Classification Search
CPC ...... G02F 1/1333; G02F 1/1362; B23K 26/00
See application file for complete search history.

(56) References Cited

U.S. PATENT DOCUMENTS

| | | |
|---|---|---|
| 7,009,676 B1 | 3/2006 | Kim |
| 2006/0275989 A1 | 12/2006 | Ting et al. |
| 2011/0109829 A1 | 5/2011 | Matthew et al. |
| 2017/0338441 A1 | 11/2017 | Higano |
| 2018/0061367 A1 | 3/2018 | Ye et al. |
| 2018/0173042 A1 | 6/2018 | Kim et al. |
| 2020/0057323 A1 | 2/2020 | Son et al. |
| 2020/0301201 A1 | 9/2020 | Cho et al. |

FOREIGN PATENT DOCUMENTS

| | | |
|---|---|---|
| KR | 10-0472356 | 2/2005 |
| KR | 10-2016-0028550 | 3/2016 |
| KR | 10-2020-0021577 | 3/2020 |

OTHER PUBLICATIONS

Non-Final Office Action dated Nov. 8, 2021, in U.S. Appl. No. 16/819,569.
Extended European Search Report dated Dec. 17, 2019, in European Patent Application No. 19192004.0.
Office Action (Result of Consultation) dated May 4, 2021, in European Patent Application No. 19192004.0.

*Primary Examiner* — Lucy P Chien
(74) *Attorney, Agent, or Firm* — H.C. Park & Associates, PLC

(57) ABSTRACT

A method of manufacturing a display device includes disposing a polarizing layer on one surface of a display panel including a thin film transistor and a pixel electrode; cutting the polarizing layer using a cutting laser beam such that a side of the polarizing layer and a side of the display panel correspond to each other; applying a conductive paste on the side of the display panel; and patterning the conductive paste using a patterning laser beam.

16 Claims, 9 Drawing Sheets

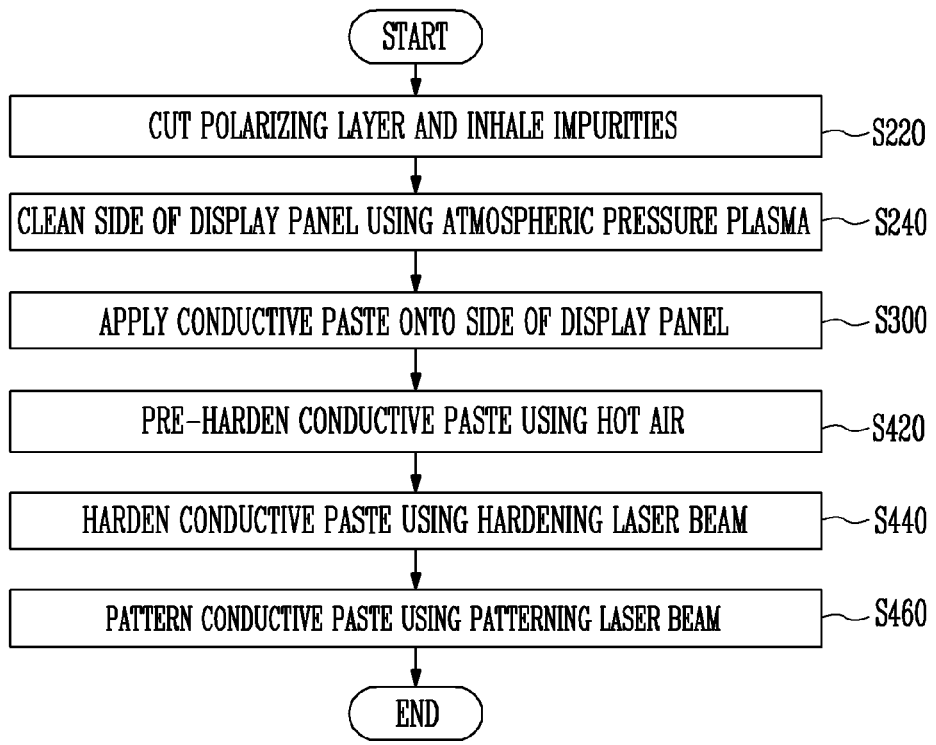
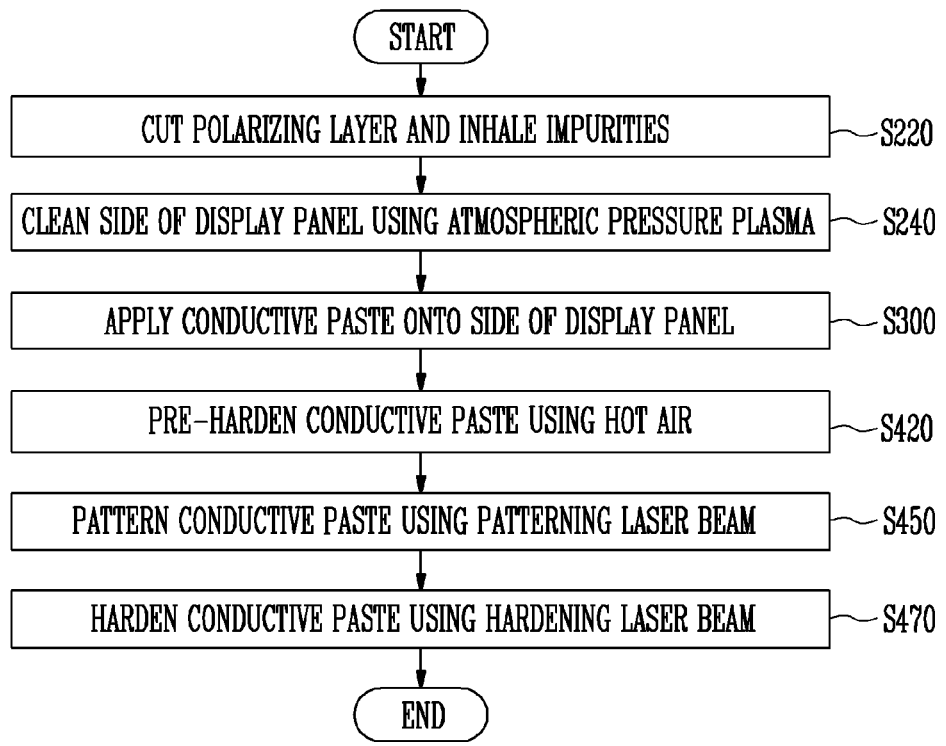

DISPLAY DEVICE AND METHOD OF MANUFACTURING THE SAME

CROSS-REFERENCE TO RELATED APPLICATION

This application claims priority from and the benefit of Korean Patent Application No. 10-2018-0096902, filed Aug. 20, 2018, which is hereby incorporated by reference for all purposes as if fully set forth herein.

BACKGROUND

Field

Exemplary embodiments generally relate to a display device, and more particularly, to a liquid crystal display device and a method of manufacturing the same.

Discussion

Display fields have been rapidly developed. In response, liquid crystal display (LCD) devices, plasma display panel (PDP) devices, electroluminescence display (ELD) devices, field emission display (FED) devices, and the like, are being developed as flat panel display devices having advantages of thinness, lightweight, and low power consumption. LCD devices are actively used in various fields, such as notebook computers, monitors, televisions, large-sized displays, and the like, due to excellent moving picture display and a high contrast ratio.

A plurality of display panels may be connected to display an image in an outdoor display, an electronic display, etc. However, a connecting portion between the display panels can be viewed due to a bezel between the display panels, and therefore, the connecting portion may interfere with video viewing. Accordingly, interest in minimizing a bezel between display panels is growing, as well as interest in realizing image display with ultra-high resolution.

The above information disclosed in this section is only for understanding the background of the inventive concepts, and, therefore, may contain information that does not form prior art.

SUMMARY

Some exemplary embodiments provide a method of manufacturing a display device, in which ultra-fine conductive patterns are formed at a side surface of the display device.

Some exemplary embodiments provide a display device that has a side at which a step difference between a display panel and a polarizing layer is removed (or at least reduced), and includes the display panel having a side at which ultra-fine conductive patterns are formed.

Additional aspects will be set forth in the detailed description which follows, and, in part, will be apparent from the disclosure, or may be learned by practice of the inventive concepts.

According to some exemplary embodiments, a method of manufacturing a display device includes: disposing a polarizing layer on one surface of a display panel including a thin film transistor and a pixel electrode; cutting the polarizing layer using a cutting laser beam such that a side of the polarizing layer and a side of the display panel correspond to each other; applying a conductive paste on the side of the display panel; and patterning the conductive paste using a patterning laser beam.

According to some exemplary embodiments, a method of manufacturing a display device includes: applying a conductive paste on at least one lateral side of a display panel, the display panel including a thin film transistor and a pixel electrode; hardening the conductive paste using a hardening laser beam; and forming a plurality of side conductive patterns by patterning the hardened conductive paste using a patterning laser beam.

According to some exemplary embodiments, a display device includes a display panel, a polarizing layer, and a driving circuit. The display panel includes a plurality of pixels, each pixel among the plurality of pixels being defined by a gate line and a data line. The polarizing layer is disposed on the display panel. The driving circuit is electrically connected to the display panel. A plurality of side conductive patterns electrically connecting the pixels and the driving circuit are formed at a bonding side corresponding to at least one lateral side of the display panel. A step difference between a portion at which the side conductive patterns are not located at the bonding side of the display panel and a side of the polarizing layer that corresponds to the bonding side is 100 μm or less.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 5 is a flowchart illustrating an example of the method shown in FIG. 1 according to some exemplary embodiments.

FIG. 6 is a flowchart illustrating an example of the method shown in FIG. 1 according to some exemplary embodiments.

DETAILED DESCRIPTION OF THE ILLUSTRATED EMBODIMENTS

Figure 1:
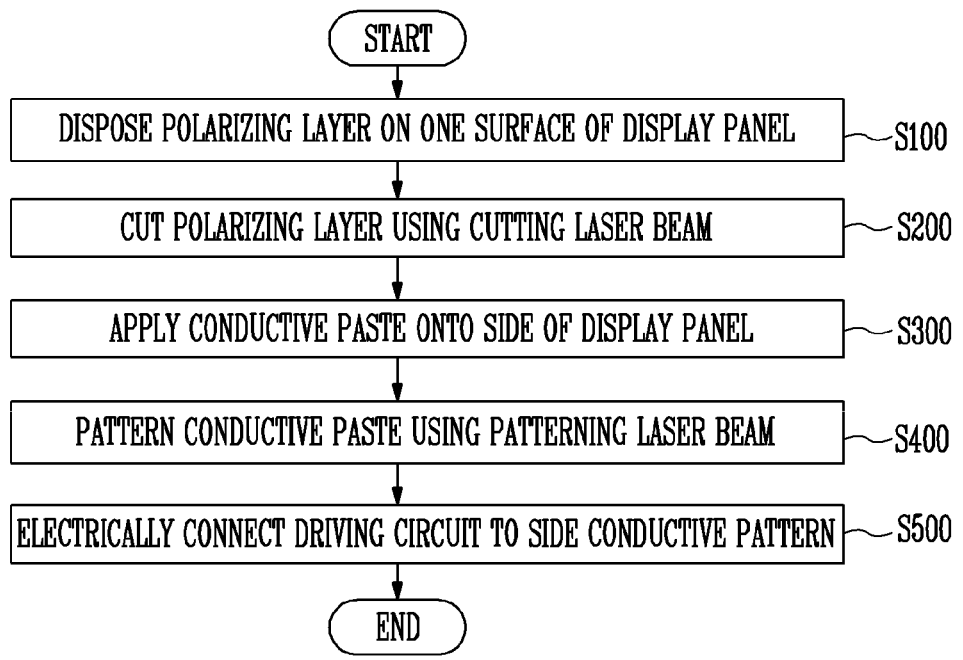
FIG. 1 is a flowchart illustrating a method of manufacturing a display device according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to cross-sectional views, isometric views, perspective views, plan views, and/or exploded illustrations that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, various exemplary embodiments will be explained in detail with reference to the accompanying drawings. Throughout the drawings and description, the same or similar reference numerals are given to the same or similar elements, and their overlapping descriptions will be omitted.

FIG. 1 is a flowchart illustrating a method of manufacturing a display device according to some exemplary embodiments.

Referring to FIG. 1, a method of manufacturing a display device may include: disposing a polarizing layer on a top of a display panel (S100); cutting the polarizing layer using to a cutting laser beam (S200); applying a conductive paste onto a side of the display panel (S300); patterning the conductive paste using a patterning laser beam (S400), and electrically connecting a driving circuit to a side conductive pattern (S500).

In some exemplary embodiments, the display device may be a liquid crystal display (LCD) device. Hereinafter, a case where the display device is an LCD device will be described. However, this is merely illustrative, and the display device is not limited thereto. For example, the display device may be a plasma display panel (PDP), an organic light emitting diode (OLED) display device, a field effect display (FED) device, an electrophoretic display device, or the like.

The display device manufactured as described above may have a side from which a step difference between a polarizing layer and a display panel is removed. In addition, side conductive patterns connected to an internal circuit of the display panel by a laser (e.g., high accuracy laser) technique may be formed at the side from which the step difference is removed. Accordingly, a driving circuit for driving the display device can be electrically connected to the display panel through side bonding of the display panel.

In a conventional display device, an electrode extends on a top of a substrate in which thin film transistors are formed, an anisotropic conductive film or the like is attached onto the electrode, and a driving chip, a printed circuit board (PCB), or the like is attached to the anisotropic conductive film in a chip on film (COF) manner. Accordingly, a side step difference occurs between a polarizing layer and a display panel (e.g., substrate including a thin film transistor, etc.), and a bezel is formed. In addition, light leakage may be viewed due to the step difference between the display panel and the polarizing layer. To prevent the light leakage from being viewed, a chassis, a frame, a black matrix, and/or the like are formed at a periphery of the display panel. Accordingly, there is a limitation in reducing the width of the bezel at the periphery of the display device.

In a display device and a method of manufacturing the same according to some exemplary embodiments, a step difference between the display panel and the polarizing layer is removed, and the display panel and the driving circuit are connected through side bonding. In this manner, a zero-bezel can be realized, and a large-sized display device having an ultra-high definition (UHD) or higher resolution can be implemented through ultra-fine laser patterning.

Figure 2:
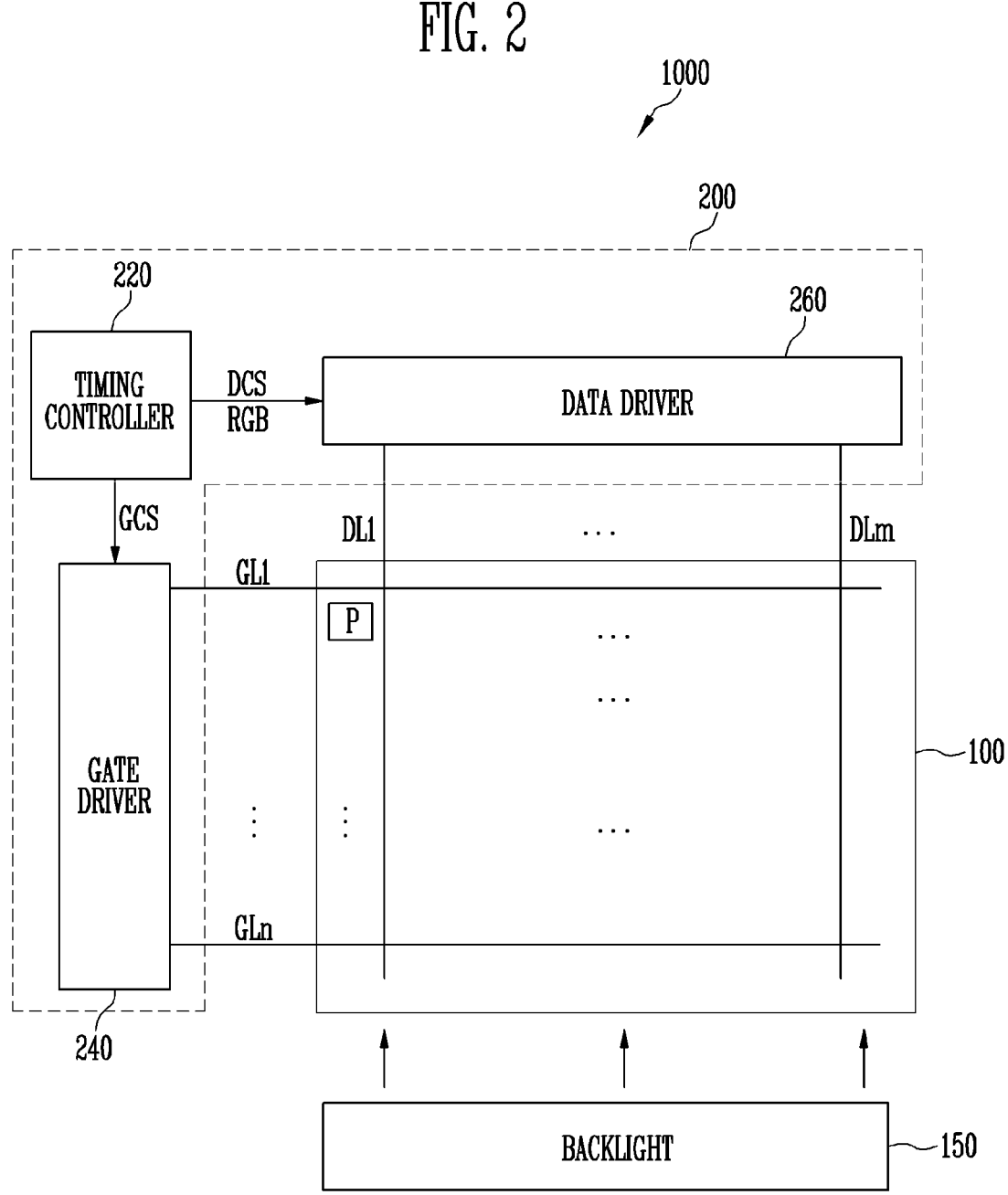
FIG. 2 is a block diagram illustrating a display device according to some exemplary embodiments.

FIG. 2 is a block diagram illustrating a display device according to some exemplary embodiments.

Referring to FIG. 2, the display device 1000 may include a display panel 100, and a driving circuit 200. In some exemplary embodiments, the display panel 100 may be a liquid crystal panel, and the display device 1000 may further include a backlight 150.

A plurality of gate lines GL1 to GLn extending in a first direction, e.g., a horizontal direction (row direction), may be included in the display panel 100. A plurality of data lines DL1 to DLm extending in a second direction, e.g., a vertical direction (column direction), intersecting the first direction may be disposed in the display panel 100.

The gate lines GL1 to GLn and the data lines DL1 to DLm, which intersect each other, may define pixels P. Although not shown, each pixel P of the display panel 100 may include a thin film transistor, a liquid crystal capacitor, and a storage capacitor. In some exemplary embodiments, each pixel P may display light of one of red, green, and blue.

The backlight 150 functions to supply light to the display panel 100. A cold cathode fluorescent lamp (CCFL), an external electrode fluorescent lamp (EEFL), a light emitting diode (LED), etc. may be used as a light source of the backlight 150.

The driving circuit 200 may include a timing controller 220, a gate driver 240, and a data driver 260.

The timing controller 220 may receive image data from a source, e.g., an external graphic source, such as a television system or a video card, and receive a control signal including a vertical synchronization signal, a horizontal synchronization signal, a main clock signal, a data enable signal, and/or the like. The timing controller 220 may generate a data control signal DCS for controlling the data driver 260 in response to the input control signal. The data control signal DCS may include a source start pulse (SSP), a source sampling clock (SSC), a source output enable (SOE), a polarity (POL), and/or the like signals. Also, the timing controller 220 may receive image data, align the received image data, and transfer the aligned image data RGB to the data driver 260. The timing controller 220 may generate a gate control signal GCS for controlling the gate driver 240 in response to the control signal.

The data driver 260 may supply a data voltage to the data lines DL1 to DLm in response to the data control signal DCS and the image data RGB.

The gate driver 240 may select (e.g., sequentially select) the gate lines GL1 to GLn in response to the gate control signal GCS supplied from the timing controller 220, and output a turn-on voltage to the selected gate line among the gate lines GL1 to GLn. A thin film transistor connected to the corresponding gate line may be turned on by the turn-on voltage.

Figure 3:
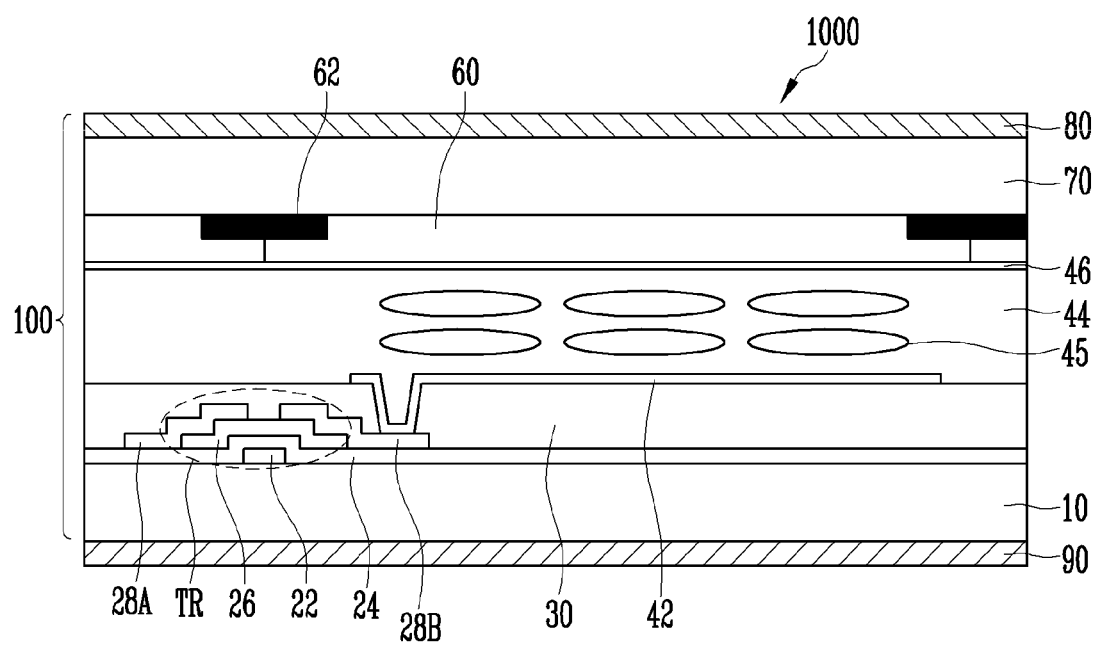
FIG. 3 is a sectional view schematically illustrating the display device of FIG. 2 according to some exemplary embodiments.

FIG. 3 is a sectional view schematically illustrating the display device of FIG. 2 according to some exemplary embodiments.

Referring to FIG. 3, the display device 1000 may include a display panel 100 and polarizing layers 80 and 90. FIG. 3 illustrates a portion of a section of the display device 1000.

The display panel 100 may include a first substrate 10, a second substrate 70, and a liquid crystal layer 44 between the first substrate 10 and the second substrate 70.

In some exemplary embodiments, the display panel 100 may include a first substrate 10 provided with a thin film transistor TR and a pixel electrode 42, a second substrate 70 provided with a common electrode 46 and a color filter 60, and a liquid crystal layer 44 disposed between the first substrate 10 and the second substrate 70.

A gate electrode 22 may be formed on the first substrate 10, and a gate insulating layer 24 may be formed over the gate electrode 22. A semiconductor layer 26 may be formed on the gate insulating layer 24 corresponding to the gate electrode 22, and a source electrode 28A and a drain electrode 28B, which are spaced apart from each other, may be formed on the semiconductor layer 26.

The gate electrode 22, the semiconductor layer 26, the source electrode 28A, and the drain electrode 28B may constitute a thin film transistor (TFT) TR. Although the thin film transistor TR having a bottom-gate structure is illustrated in FIG. 3, exemplary embodiments are not limited thereto. For example, the thin film transistor TR may be formed in a top-gate structure, a dual-gate structure, etc.

A protective layer 30 is formed over the thin film transistor TR, and a pixel electrode 42 connected to the drain electrode 28B may be formed on the protective layer 30.

A common electrode 46 may be formed above the pixel electrode 42. In some exemplary embodiments, the liquid crystal layer 44 including a plurality of liquid crystal molecules 45 may be provided between the pixel electrode 42 and the common electrode 46.

A color filter 60 may be formed on the common electrode 46. In some exemplary embodiments, a black matrix 62 may be provided in a recess of the color filter 60. In some exemplary embodiments, a protective layer (overcoat layer) may be further disposed to between the common electrode 46 and the color filter 60.

When the thin film transistor TR is turned on according to a gate signal applied to the gate electrode 22, a data signal is applied to the pixel electrode 42 through the thin film transistor TR so that an electric field is generated between the pixel electrode 42 and the common electrode 46. The plurality of liquid crystal molecules 45 of the liquid crystal layer 44 are rearranged along the electric field so that a corresponding pixel P can display a grayscale corresponding to the data signal.

In some exemplary embodiments, the thin film transistor TR, the pixel electrode 42, and the common electrode 46 may respectively extend through conductive lines, and be electrically connected respectively to side conductive patterns formed at a side of the display panel 100.

In some exemplary embodiments, the thin film transistor TR, the pixel electrode 42, and the common electrode 46 may be provided on the first substrate 10, and the color filter 60 may be provided on the second substrate 70. The liquid crystal layer 44 may be disposed between the first substrate 10 and the second substrate 70. The liquid crystal molecules 45 may be arranged in a horizontal direction by the electric field formed between the pixel electrode 42 and the common electrode 46 (e.g., an in-plane switching (IPS) mode, a plane to line switching (PLS) mode, a fringe field switching (FFS) mode, etc.).

In some exemplary embodiments, the thin film transistor TR, the pixel electrode 42, the common electrode 46, and the color filter 60 may be provided on the first substrate 10 (e.g., a color filter on array (COA) structure). The liquid crystal layer 44 and the second substrate 70 may be sequentially disposed on the color filter 60.

In some exemplary embodiments, the polarizing layers 80 and 90 may be respectively disposed at the top and bottom of the display panel 100. For example, a first polarizing layer 80 may be disposed on the top of the color filter 60, and a second polarizing layer 90 may be disposed under the bottom of the first substrate 10. In some exemplary embodiments, the first and second polarizing layers 80 and 90 may be provided in the form of a polarizing film. However, this is merely illustrative, and the display device 1000 may have only one of the first and second polarizing layers 80 and 90.

In some exemplary embodiments, the polarization axes of the first and second polarizing layers 80 and 90 may be orthogonal to each other.

FIGS. 4A to 4G are views of a display device at various stages of manufacture according to some exemplary embodiments. FIG. 5 is a flowchart illustrating an example of the method shown in FIG. 1 according to some exemplary embodiments.

Referring to FIGS. 1 to 5, the method of manufacturing the display device 1000 may include disposing a polarizing layer 80A on the top of a display panel 100 (S100), cutting the polarizing layer 80A (S220), cleaning a side of the display panel 100 using atmospheric pressure plasma (S240), applying a conductive paste CPA onto the side of the display panel 100 (S300), hardening the conductive paste CPA (S420 and S440), patterning the conductive paste CPA using a patterning laser beam (S460), and electrically connecting a driving circuit 200 to a side conductive pattern CP (S500).

A polarizing layer 80A may be disposed on the top of a display panel 100 in which a thin film transistor TR, a pixel electrode 42, a common electrode 46, a liquid crystal layer 44, and a color filter 60 are formed (S100). The display panel 100 may include a first substrate 10, a second substrate 70, and a liquid crystal layer 44 between the first substrate 10 and the second substrate 70.

In some exemplary embodiments, the thin film transistor TR and the pixel electrode 42 may be provided on the first substrate 10, and the common electrode 46 and the color filter 60 may be provided on the second substrate 70. In some exemplary embodiments, the thin film transistor TR, the pixel electrode 42, and the common electrode 46 may be provided on the first substrate 10, and the color filter 60 may be provided on the second substrate 70. In some exemplary embodiments, the thin film transistor TR, the pixel electrode 42, the common electrode 46, and the color filter 60 may be provided on the first substrate 10.

In FIGS. 4A to 4G, for convenience of description, a case where the components included in the display panel 100 are divided into a liquid crystal panel 50 and the color filter 60 will be described. For example, the liquid crystal panel 50 may include the first substrate 10, the thin film transistor TR, the pixel electrode 42, the common electrode 46, and the liquid crystal layer 44. In addition, the color filter 60 may further include components of the second substrate 70 provided on the color filter 60.

The display panel 100 may be in a state in which it is cut by scribing a mother substrate using a diamond cutter, a laser cutter, or the like. Therefore, the flatness of a side of the display panel 100 may be low and impurities may exist.

Figure 4A:
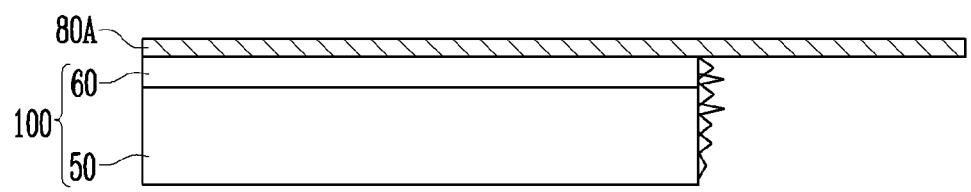
FIGS. 4A, 4B, 4C, 4D, 4E, 4F, and 4G are views of a display device at various stages of manufacture according to some exemplary embodiments.

The polarizing layer 80A may be attached onto the color filter 60. Although FIG. 4A illustrates that the polarizing layer 80A is disposed on only the color filter 60, exemplary embodiments are not limited thereto. For example, the polarizing layer 80A may be disposed on the top and under the bottom of the display panel 100 such that their polarization axes are orthogonal to each other.

In some exemplary embodiments, the process of disposing the polarizing layer 80A may include a cleaning process of removing an alien substance of the display panel 100, an attachment process of attaching the polarizing layer 80A while separating a protective film after the display panel 100 and the polarizing layer 80A are aligned, and an autoclave process for removing bubbles between the polarizing layer 80A and the display panel 100 and enhancing adhesion between the polarizing layer 80A and the display panel 100.

A planar area of the polarizing layer 80A may be larger than that of the display panel 100 so as to enhance adhesion between the polarizing layer 80A and the display panel 100.

Figure 4B:
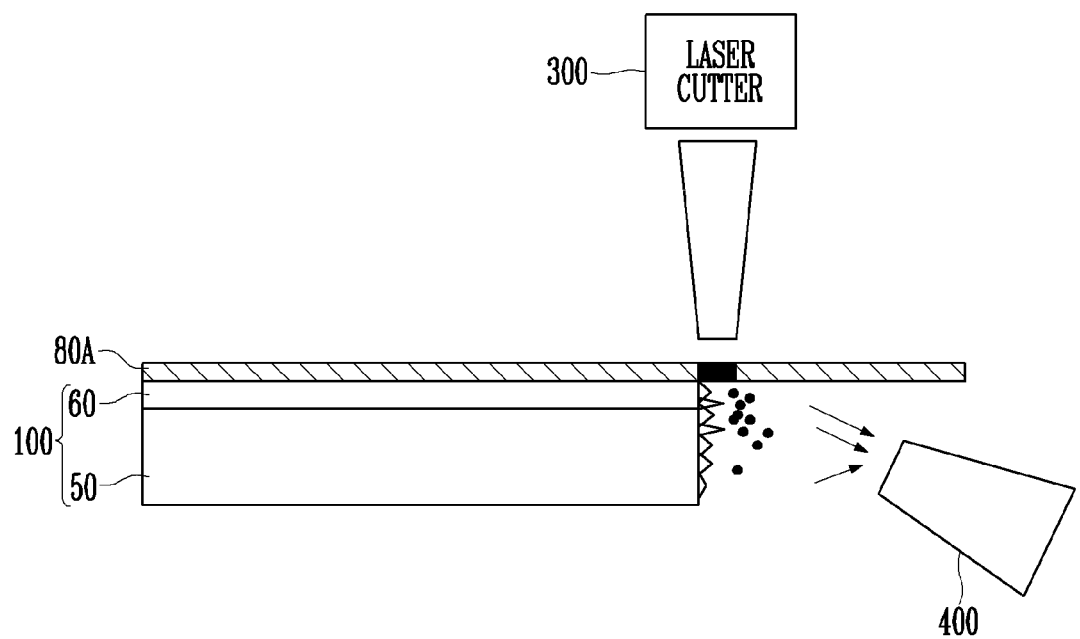

Subsequently, the polarizing layer 80A may be cut such that a side of the polarizing layer 80A corresponds to that of the display panel 100 (S200). In some exemplary embodiments, as shown in FIG. 4B, the side of the display panel 100 may be polished at the same time when the polarizing layer 80A is cut by a cutting laser beam from a laser cutter 300 (S200). Simultaneously, residues and impurities that are generated by the cutting and polishing may be inhaled via a suction unit 400 (S220).

The cutting laser beam may be output from a predetermined laser cutter 300. For example, the cutting laser beam may be a femto-second laser beam, and may be implemented using a gas laser, such as a helium-neon (He—Ne) laser or a carbon dioxide ($CO_2$) laser in an infrared waveform band.

The cutting laser beam may be accurately irradiated onto the polarizing layer 80A and the side of the display panel 100 corresponding thereto. The side of the polarizing layer 80A and the side of the display panel 100 that are cut by the cutting laser beam may be planarized. That is, a step difference between the side of the polarizing layer 80A and the side of the display panel 100 may be removed. For example, the step difference between the side of the polarizing layer 80A and the side of the display panel 100 may be 100 μm or less. For instance, the step difference between the side of the polarizing layer 80A and the side of the display panel 100 is 0, i.e., there is no step difference.

In a conventional process of cutting a substrate, a side of the substrate is planarized using an edge grinding technique. However, in the edge grounding technique, much facility cost is required to perform the edge grounding technique, it is difficult to form a step difference within 200 jam, and the panel damage rate caused by a physical impact is relatively high. However, in the cutting and polishing process (S220) using the cutting laser beam according to some exemplary embodiments, a step difference between the side of the polarizing layer 80A and the side of the display panel 100 is decreased to 100 jam or less at low cost, and the strength of an edge portion can be enhanced. For example, the step difference between the side of the polarizing layer 80A and the side of the display panel 100 may be 50 jam or less.

Residue and alien substances such as fumes may be generated by the cutting of the polarizing layer 80A and the polishing of the display panel 100, and the side of the display panel 100 may be contaminated. Accordingly, a suction unit 400 may be provided, and the contamination can be prevented by inhaling the fumes.

Although FIG. 4B illustrates that the laser cutting process is performed on only one side of the display panel 100, exemplary embodiments are not limited thereto. For example, the laser cutting and polishing process may be performed on other sides of the display panel 100.

Figure 4C:
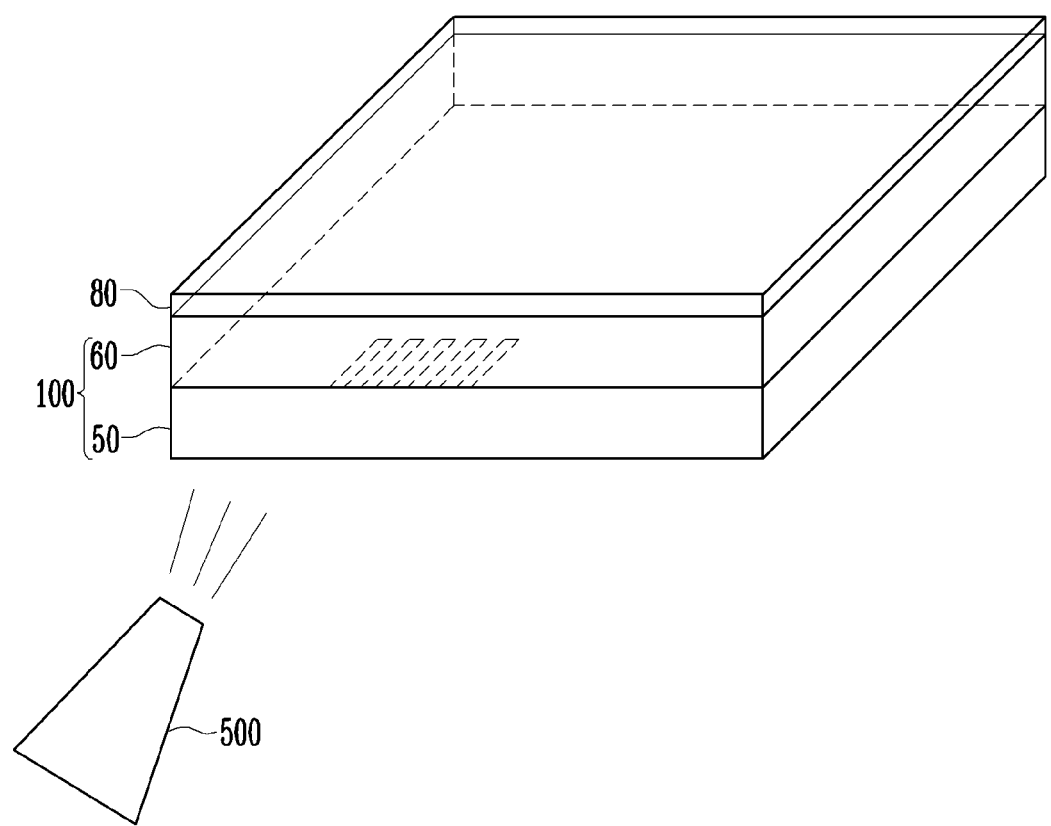

As shown in FIG. 4C, the side of the display panel 100 may be cleaned by atmospheric pressure plasma using a plasma cleaning unit 500 (S240). A contaminant such as an organic material, which exists at the side through plasma cleaning, may be removed once more. In addition, a hydrophilic property is provided to the surface of the display panel 100 such that a surface contact angle is lowered. Accordingly, adhesion between a conductive paste and the side of the display panel 100 can be enhanced.

Figure 4D:
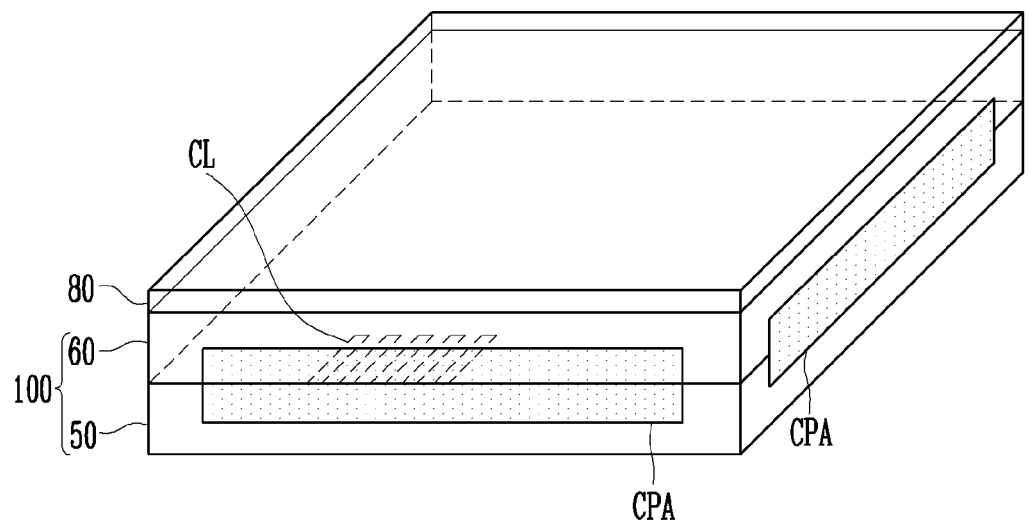

As shown in FIG. 4D, a conductive paste CPA may be applied onto the side of the display panel 100 on which the plasma cleaning has been performed (S300). In some exemplary embodiments, the conductive paste CPA may be integrally formed in a preset (or predetermined) application region of the display panel 100 through a printing technique. Alternatively (or additionally), the conductive paste CPA may be integrally formed in the application region through a spraying technique.

In some exemplary embodiments, the application region may include a portion of one side of the display panel 100. For example, the application region of the one side of the display panel 100 may be a region including a portion of the liquid crystal panel 50 and a portion of the color filter 60. Alternatively, the application region of the one side of the display panel 100 may include only a portion of the liquid crystal panel 50.

Also, as shown in FIG. 4D, the application region may be formed at a plurality of sides of the display panel 100.

The application region may be formed to be in contact with a plurality of connecting lines CL formed in the liquid crystal panel 50. Each of the connecting lines CL may be connected to at least one of the thin film transistor TR, the pixel electrode 42, the common electrode 46, and the color filter 60.

The conductive paste CPA may include a metallic material having high electrical conductivity. In some exemplary embodiments, the conductive paste CPA may include at least one selected from silver (Ag), copper (Cu), gold (Au), and aluminum (Al).

In some exemplary embodiments, the conductive paste CPA may be pre-hardened by hot air (S420). For example, a heating unit may supply hot air of about 90° C. to the conductive paste CPA to maintain the shape of the conductive paste CPA. For instance, the conductive paste CPA formed at the side of the display panel 100 may flow down due to gravity, but the pre-hardening process can prevent the shape of the conductive paste CPA from being changed. However, this is merely illustrative, and the pre-hardening process may be omitted to reduce process time.

The pre-hardened conductive paste CPA may be hardened by irradiating a hardening laser beam onto the pre-hardened conductive paste CPA (S440). In some exemplary embodiments, the hardening laser beam is a square-wave laser beam having an infrared waveform, which forms high temperature of 200° C. or more. The hardening laser beam locally supplies high-temperature heat so that a portion, except the application region, can be prevented from being heated. Thus, another portion of the display panel including liquid crystals, etc. can be prevented from being damaged.

Accordingly, a volatile material in the conductive paste CPA is evaporated, and only a pure conductive material (e.g., silver (Ag)) may remain. Further, the conductive material may be firmly fixed to the side of the display panel 100 through the hardening process, and the surface hardness of the conductive material may be reinforced. However, this is merely illustrative, and the hardening process of the conductive paste CPA may be performed after the patterning process so as to reduce process time.

Figure 4E:
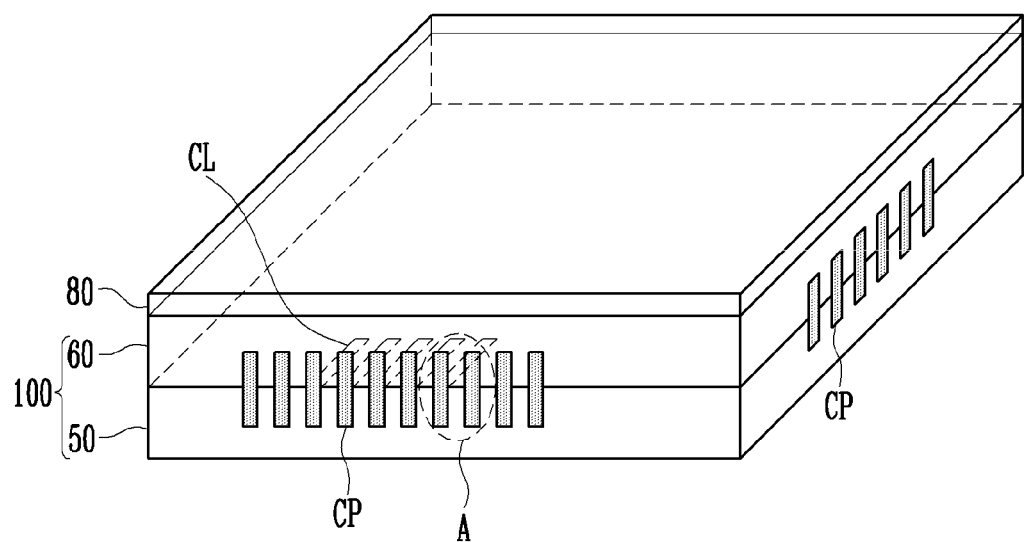
Figure 4F:
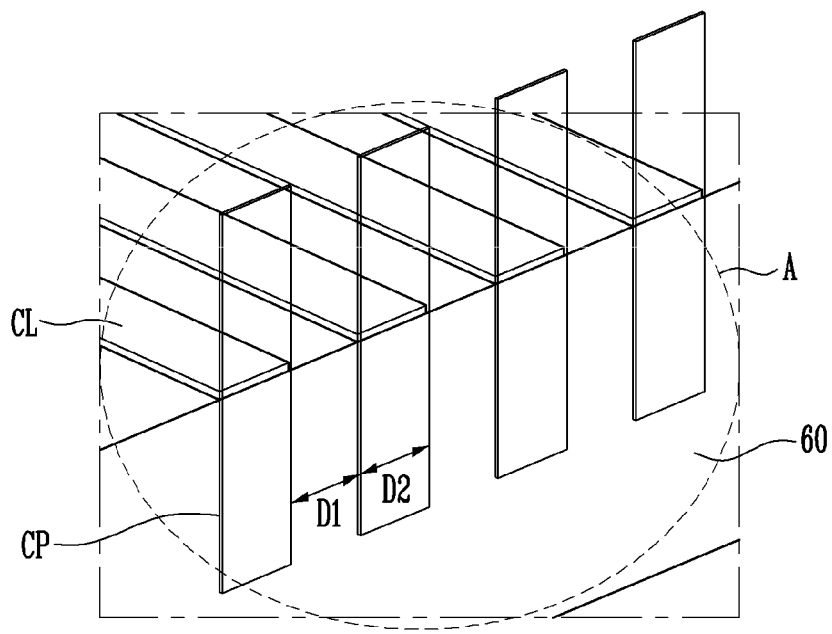

As shown in FIGS. 4E and 4F, the conductive paste CPA may be patterned by a patterning laser beam (S460). In some exemplary embodiments, the patterning laser beam may have a wavelength in an infrared area, and etch the hardened conductive paste CPA. The patterning laser beam may perform patterning even at a distance of about 20 m or less between side conductive patterns CP.

A plurality of side conductive patterns CP may be formed through laser patterning. The side conductive patterns CP may be electrically connected to the connecting lines CL, respectively. As shown in FIG. 4F, one side portion of the connecting line CL is connected to the side conductive pattern CP so that the connecting line CL and the side conductive pattern CP can be electrically connected to each other.

In some exemplary embodiments, the distance D1 between the side conductive patterns CP may be set to about 30 m or less. For example, the laser patterning process may be performed such that the distance D1 between the side conductive patterns CP is about 150 m, corresponding to full HD resolution, or may be performed such that the distance D1 between the side conductive patterns CP is about 50 m, corresponding to UHD or 4 k UHD resolution. Alternatively, the laser patterning process may be performed such that the distance D1 between the side conductive patterns CP is about 25 m, corresponding to 8 k UHD or more resolution. That is, the distance between the side conductive patterns CP can be relatively easily controlled corresponding to the distance between pixels (or connecting lines CL) formed in the display panel 100, the number of pixels (or connecting lines CL) formed in the display panel 100, etc.

In some exemplary embodiments, the lateral width D2 of each of the side conductive patterns CP may be within a range of about 2 Lm to 4 am.

The conductive paste may be removed by the laser patterning in the application region except the side conductive patterns CP. In addition, boundaries of the side conductive patterns CP having a very dense distance through the laser patterning can be clearly distinguished. In the laser patterning for forming the side conductive patterns CP, cost for a jig is not required, the conductive patterns can be accurately machined, and production cost can be considerably reduced. Further, the laser patterning can be effectively used in manufacturing of display devices having various high resolutions, such as FHD, UHD, 4 k UHD, and 8 k UHD.

Meanwhile, a color difference may be shown between a portion at which the conductive paste CPA is removed by the laser patterning and a portion at which the conductive paste is not attached. In addition, the portion at which the conductive paste CPA is removed by the laser patterning is not conducted.

Figure 4G:
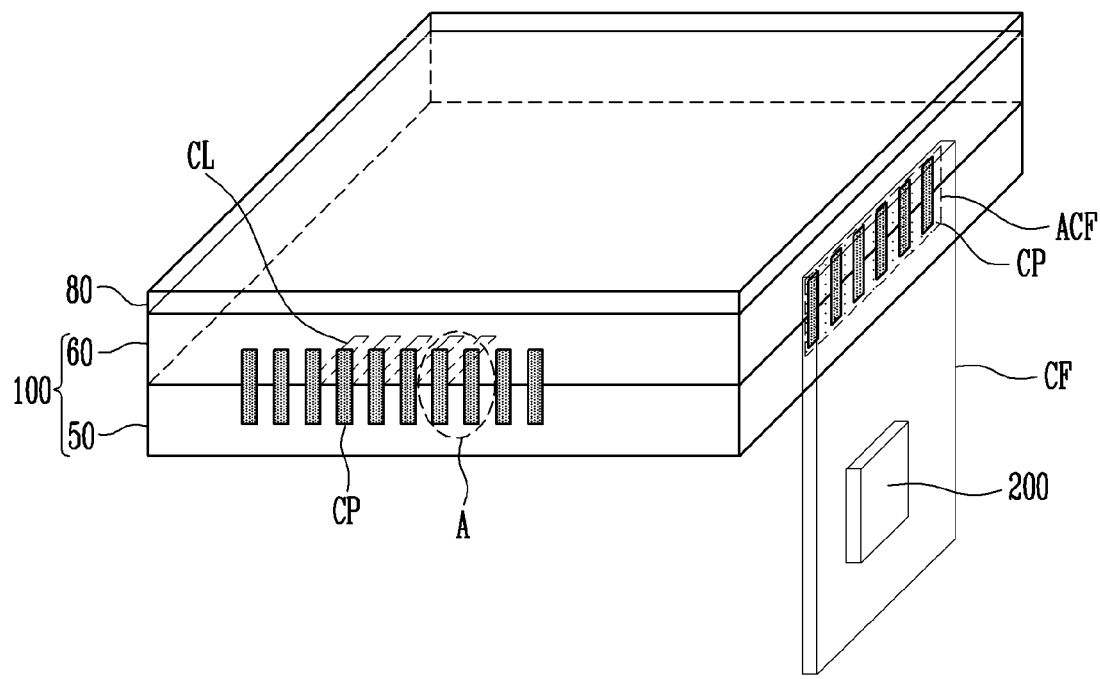

As shown in FIG. 4G, an anisotropic conductive film ACF may be attached to the side conductive patterns CP, and a driving circuit 200 and a printed circuit board (PCB) may be electrically connected to the side conductive patterns CP (e.g., an outer lead bonding (OLB) process) (S500).

In some exemplary embodiments, a plurality of anisotropic conductive films ACF may be attached to one side of the display panel 100 at a predetermined distance from one another. Therefore, the display panel 100 may be electrically connected to the driving circuit 200 through side bonding.

The side conductive patterns CP may be attached to a first portion of each of the anisotropic conductive films ACF. A conductive film CF including conductive lines and the driving circuit 200 may be attached to a second portion of each of the anisotropic conductive films ACF. The driving circuit 200 may include at least one of the timing controller 220, the gate driver 240, and the data driver 260. The timing controller 220, the gate driver 240, and the data driver 260 may be implemented with a driving integrated circuit (IC) chip, an IC, etc. This, however, is merely illustrative, and the form and configuration of the driving circuit 200 are not limited thereto. For example, at least one of the timing controller 220, the gate driver 240, and the data driver 260 may be integrated in or on the display panel 100. The driving circuit 200 may be electrically connected to an external controller, a processor, etc., through a PCB.

As described above, in the display device 1000 and a method of manufacturing the same according to some exemplary embodiments, a step difference between the display panel 100 and the polarizing layer 80 is removed by the laser cutting and polishing so that the width of a bezel for the OLB process can be considerably reduced. In addition, the side conductive patterns CP are accurately formed by the ultra-fine laser patterning so that a large-sized display device having ultra-high resolution of UHD or more can be implemented.

FIG. 6 is a flowchart illustrating an example of the method shown in FIG. 1 according to some exemplary embodiments.

The method of FIG. 6 is identical to the method according to FIG. 5, except the order of a process of hardening a conductive paste. Therefore, identical or corresponding components and processes are designated by like reference numerals, and their overlapping descriptions will be omitted.

The method of manufacturing the display device 1000 may include disposing a polarizing layer 80 on the top of a display panel 100 (S100), cutting the polarizing layer 80 (S220), cleaning a side of the display panel 100 using atmospheric pressure plasma (S240), applying a conductive paste CPA onto the side of the display panel 100 (S300), pre-hardening the conductive paste CPA (S420), patterning the conductive paste CPA using a patterning laser beam (S450), and hardening the patterned conductive paste CPA using a hardening laser beam (S470). The steps S100, S220, S240, S300, and S420 have been described with reference to FIGS. 3 to 4D, and therefore, their overlapping descriptions will be omitted.

A pre-hardened conductive paste CPA may be patterned into side conductive patterns CP by a patterning laser beam (S450). The pre-hardened conductive paste CPA is in a state in which its hardness is weak, and therefore, a laser machining number may decrease. For example, laser patterning may be performed eight times or more so as to pattern the completely hardened conductive paste CPA. However, the side conductive patterns CP may be formed by performing only two-time or three-time laser patterning on the pre-hardened conductive paste CPA. Accordingly, a laser patterning number decreases, and thus, manufacturing time and manufacturing cost can be reduced. Subsequently, the side conductive patterns CP may be hardened by a hardening laser beam (S470).

Figure 7:
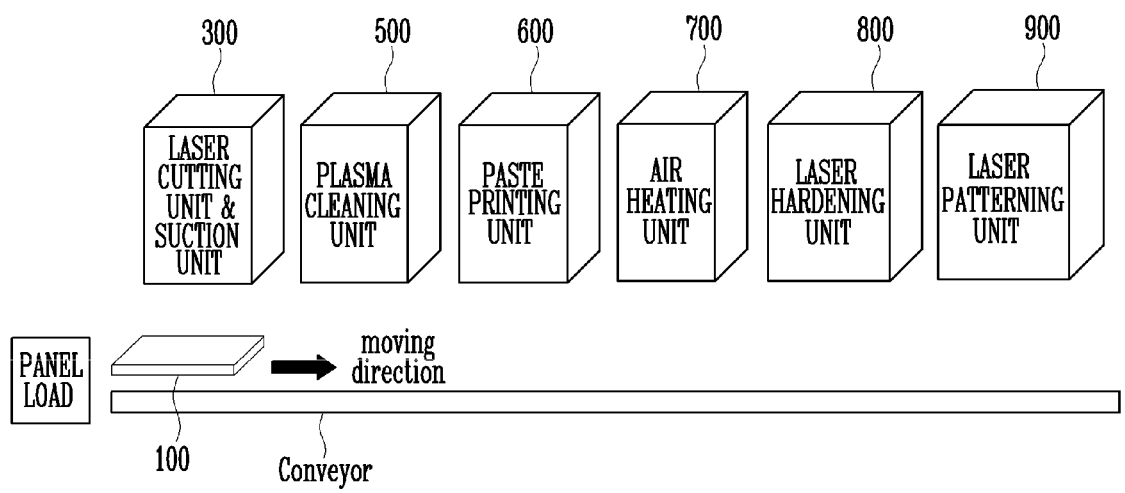
FIG. 7 is a view briefly illustrating a facility for performing the method shown in FIG. 1 according to some exemplary embodiments.

FIG. 7 is a view briefly illustrating a facility for performing the method shown in FIG. 1 according to some exemplary embodiments.

Referring to FIGS. 1 to 5 and 7, the method may be performed through an in-line process. That is, processes including a process of patterning the side conductive patterns CP, an OLB process, and an unloading process from a process of loading the display panel 100 may be automatically performed in a lump, e.g., in an assembly line fashion.

In some exemplary embodiments, the facility for manufacturing the display device 1000 may include a laser cutting unit 300, a plasma cleaning unit 500, a conductive paste printing unit 600, an air heating unit 700, a laser hardening unit 800, and a laser patterning unit 900. Also, the facility may further include an autoclave for combining the polarizing layer 80 and the display panel 100 together.

The display panel 100 may be conveyed in a direction parallel to the top of the display panel 100 along a conveyor. When the display panel 100 is conveyed, attaching a polarizing layer 80A to the display panel 100 (S100), cutting the polarizing layer 80A (S220), cleaning a side of the display panel 100 (S240), applying a conductive paste CPA (S300), pre-hardening the conductive paste CPA (S420), hardening the conductive paste CPA (S440), and patterning the conductive paste CPA to side conductive patterns CP (S460) may be sequentially performed.

Figure 8A:
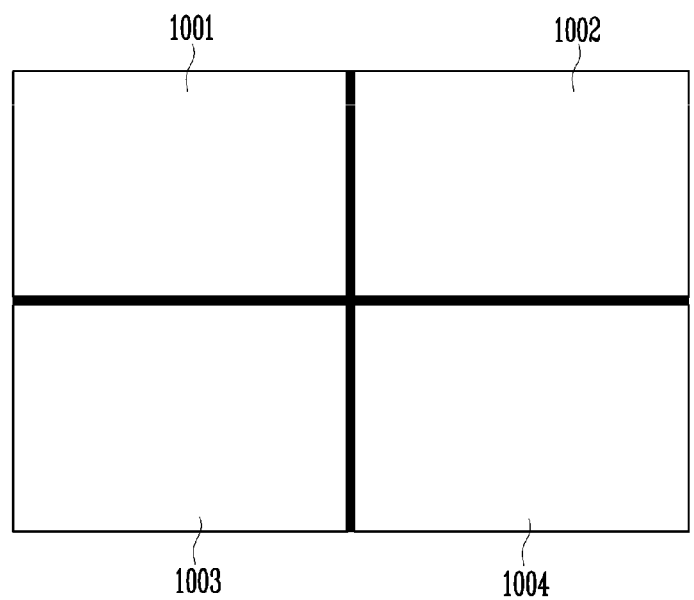
FIGS. 8A, 8B, and 8C are views illustrating a display device according to some exemplary embodiments.
Figure 8B:
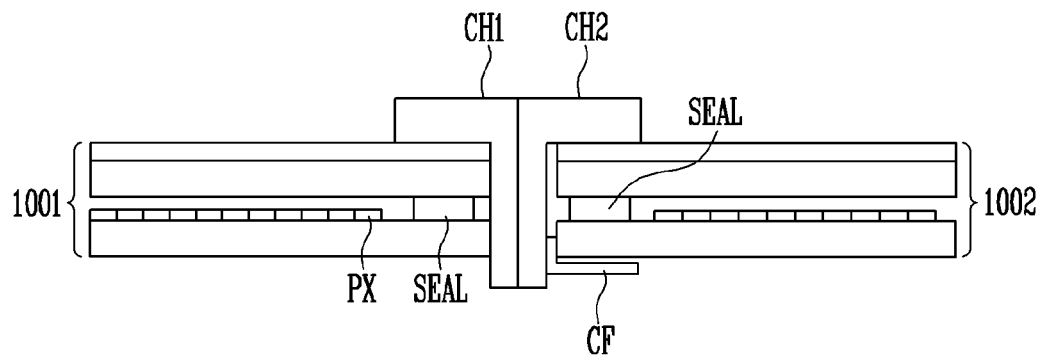
Figure 8C:
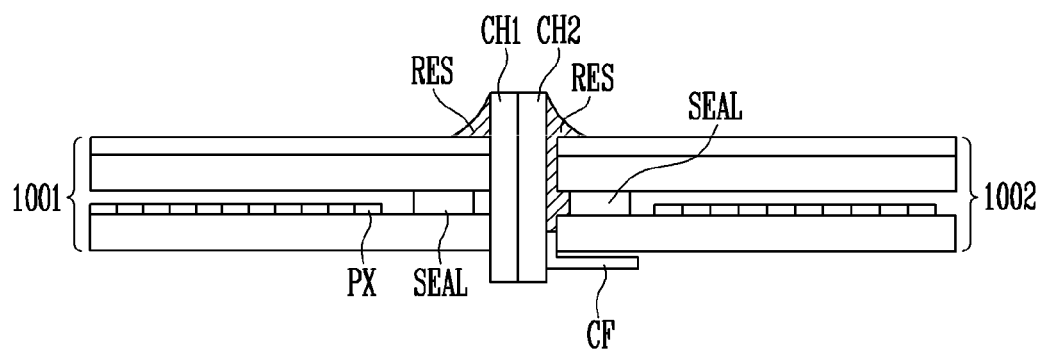

FIGS. 8A to 8C are views illustrating a display device according to some exemplary embodiments.

Referring to FIGS. 8A to 8C, a plurality of display devices 1001 to 1004 may be coupled to display an image. For example, the display devices 1001 to 1004 may be connected to implement a public information display (PID) having an outdoor display structure, etc. Image quality may be degraded due to a bezel between the display devices 1001 to 1004. For example, the bezel is viewed, and therefore, it may interfere with video viewing. However, in the display devices 10001 to 1004 according to some exemplary embodiments, a conductive film CF including a driving IC, etc. is bonded to side conductive patterns so that the width of the bezel can be remarkably decreased. Thus, the width of chassis CH1 and CH2 for covering the display devices 1001 to 1004 and preventing light leakage can be decreased.

For example, the width of a connecting part for connecting two adjacent display devices among the display devices 1001 to 1004 may be decreased to less than about 1 mm, and the shortest distance between pixel regions of two actually adjacent display devices may be decreased to less than about 1.5 mm. Thus, the bezel between the display devices 1001 to 1004 is not viewed in the combined display structure in which the plurality of display devices 1001 to 1004 are connected to display one image. Further, the PID can display an image having ultra-high resolution of UHD or more, using ultra-fine side conductive patterns.

In some exemplary embodiments, as shown in FIG. 8B, the chassis CH1 and CH2 may cover a portion (e.g., bezel portion) of the top of each of the display devices 1001 to 1004. For example, a portion of the chassis CH1 and CH2 may overlap with a sealing part SEAL of each of the display devices 1001 to 1004.

In some exemplary embodiments, as shown in FIG. 8C, the chassis CH1 and CH2 do not cover the bezel between the display devices 1001 to 1004, and the bezel between the display devices 1001 to 1004 may be covered using a material such as resin RES. For instance, a step difference between a side of a polarizing layer and a side of a display panel is decreased to 100 m or less, and therefore, the width of the chassis, a frame, etc. may be decreased. The resin RES may connect the chassis CH1 and CH2 and the display devices 1001 to 1004 or connect the chassis CH1 and CH2 and each of the display devices 1001 to 1004, as well as cover the bezel. Accordingly, the width of the bezel between the display devices 1001 to 1004 is decreased, and the connecting part and bezel between the display devices 1001 to 1004 are not viewed by a user.

Figure 9:
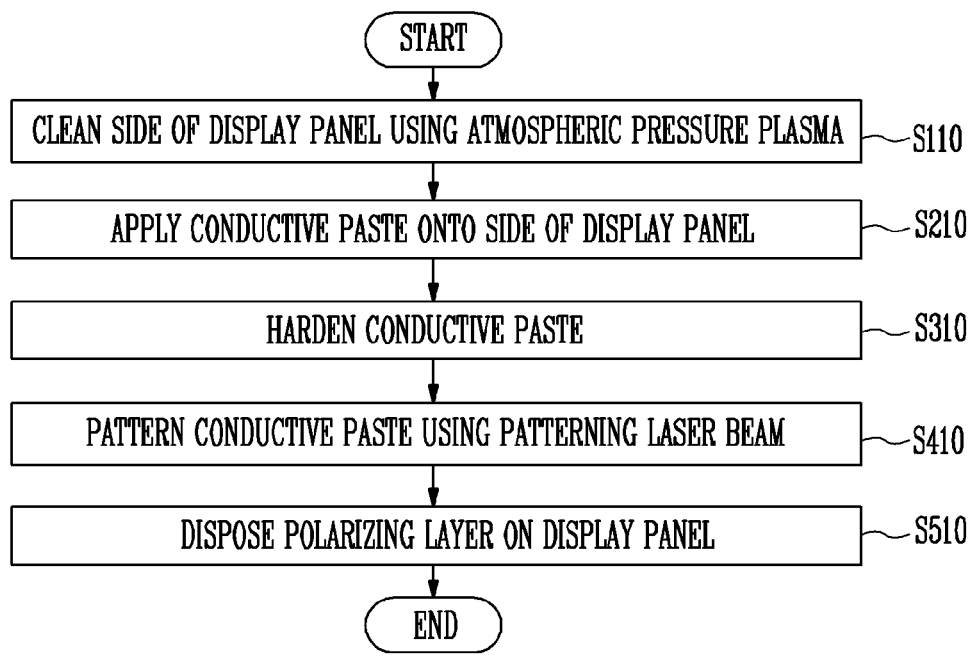
FIG. 9 is a flowchart illustrating an example of a method of manufacturing a display device according to some exemplary embodiments.

FIG. 9 is a flowchart illustrating an example of a method of manufacturing a display device according to some exemplary embodiments.

The method of FIG. 9 is a method obtained by omitting some processes of the method according to FIG. 5 or changing the order of some processes of the method according to FIG. 5. Therefore, identical or corresponding components and processes are designated by like reference numerals, and their overlapping descriptions will be omitted.

Referring to FIG. 9, the method may include cleaning a side of a display panel using atmospheric pressure plasma (S110), applying a conductive paste onto the side of the display panel (S210), hardening the conductive paste using a laser beam (S310), patterning the hardened conductive paste using a patterning laser beam (S410), and disposing a polarizing layer on the display panel (510). In this manner, the polarizing layer may be disposed after side conductive patterns are formed. Therefore, a process of cutting the polarizing layer may be omitted. In addition a pre-hardening process is omitted. Accordingly, manufacturing time and manufacturing cost can be considerably reduced.

Exemplary embodiments can be applied to methods of manufacturing display devices, display devices, and electronic devices including the same. For example, exemplary embodiments can be applied to televisions, computer monitors, notebook computers, digital cameras, mobile phones, smart pads, personal digital assistants, personal media players, MP3 players, navigation systems, camcorders, potable game consoles, and the like. Also, exemplary embodiments can be applied to outdoor advertising boards, large-sized displays, electronic displays, public information displays, and the like.

In the display device and the method of manufacturing the same according to various exemplary embodiments, a step difference between a display panel and a polarizing layer is removed through laser cutting and polishing so that the width of a bezel for an OLB process can be considerably decreased. In addition, side conductive patterns can be accurately formed through ultra-fine laser patterning so that a large-sized display device having ultra-high resolution of UHD or more can be implemented.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A method of manufacturing a display device, the method comprising:
    disposing a polarizing layer on one surface of a display panel comprising a thin film transistor and a pixel electrode;
    cutting the polarizing layer using a cutting laser beam such that a side of the polarizing layer and a side of the display panel correspond to each other;
    applying a conductive paste on the side of the display panel; and
    patterning the conductive paste using a patterning laser beam,
    wherein the side of the display device is simultaneously polished as the polarizing layer is being cut.

2. The method of claim 1, wherein a step difference between the side of the polarizing layer and the side of the display panel is 100 μm or less.

3. The method of claim 1, wherein the conductive paste is integrally formed on a predetermined application region of the side of the display panel using a printing technique.

4. The method of claim 1, wherein the display panel further comprises:
    a common electrode disposed above the pixel electrode; and
    a color filter disposed on the common electrode.

5. The method of claim 4, wherein patterning the conductive paste forms a plurality of side conductive patterns, each of the plurality of side conductive patterns being electrically connected respectively to at least one of the thin film transistor, the pixel electrode, the common electrode, and the color filter.

6. The method of claim 5, wherein a distance between each of the side conductive patterns is 30 μm or less.

7. The method of claim 5, further comprising:
electrically connecting a driving circuit and a printed circuit board to the side conductive patterns via an anisotropic conductive film.

8. The method of claim 1, wherein cutting the polarizing layer comprises:
inhaling impurities generated in response to cutting the polarizing layer; and
cleaning the side of the display panel using atmospheric pressure plasma.

9. The method of claim 1, wherein applying the conductive paste comprises:
after the conductive paste is applied, pre-hardening the conductive paste by supplying hot air to the conductive paste; and
hardening the pre-hardened conductive paste by irradiating a hardening laser beam onto the pre-hardened conductive paste.

10. The method of claim 1, wherein patterning the conductive paste further comprises:
before the patterning of the conductive paste, pre-hardening the conductive paste by supplying hot air to the conductive paste; and
after the patterning of the conductive paste, hardening the pre-hardened conductive paste by irradiating a hardening laser beam onto the pre-hardened conductive paste.

11. The method of claim 1, wherein the conductive paste comprises at least one selected from the group consisting of silver, copper, gold, and aluminum.

12. The method of claim 1, further comprising:
conveying the display panel in a direction parallel to the one surface of the display panel along a predefined conveyor line,
wherein, as the display panel is being conveyed, the polarizing layer is disposed on the one surface of the display panel, the polarizing layer is cut, the conductive paste is applied on the side of the display panel, and the conductive paste is patterned in sequential order.

13. A method of manufacturing a display device, the method comprising:
applying a conductive paste on at least one lateral side of a display panel, the display panel comprising a thin film transistor and a pixel electrode;
hardening the conductive paste using a hardening laser beam; and
forming a plurality of side conductive patterns by patterning the hardened conductive paste using a patterning laser beam.

14. The method of claim 13, wherein hardening the conductive paste comprises:
pre-hardening the conductive paste by supplying hot air to the conductive paste; and
hardening the pre-hardened conductive paste by irradiating a hardening laser beam onto the pre-hardened conductive paste.

15. The method of claim 13, wherein applying the conductive paste comprises:
attaching a polarizing layer to top and bottom surfaces of the display panel, the at least one lateral side extending between the top and bottom surfaces;
cutting the polarizing layer using a cutting laser beam such that at least one lateral side of the polarizing layer and the at least one lateral side of the display panel correspond to each other;
cleaning the at least one lateral side of the display panel using atmospheric pressure plasma; and
integrally forming the conductive paste in a predetermined application region of the cleaned at least one lateral side of the display panel.

16. The method of claim 13, further comprising:
attaching a polarizing layer to top and bottom surfaces of the display panel comprising the side conductive patterns, the at least one lateral side extending between the top and bottom surfaces.

* * * * *